US012708100B1

(12) United States Patent
Rainbow et al.

(10) Patent No.: US 12,708,100 B1
(45) Date of Patent: Aug. 18, 2026

(54) FEEDING STATION ELEVATOR

(71) Applicants: Raymond Rainbow, North Syracuse, NY (US); Kimberly Rainbow, North Syracuse, NY (US)

(72) Inventors: Raymond Rainbow, North Syracuse, NY (US); Kimberly Rainbow, North Syracuse, NY (US)

( * ) Notice: Subject to any disclaimer, the term of this patent is extended or adjusted under 35 U.S.C. 154(b) by 0 days.

(21) Appl. No.: 18/639,585

(22) Filed: Apr. 18, 2024

(51) Int. Cl.
*A01K 5/01* (2006.01)

(52) U.S. Cl.
CPC .................................. *A01K 5/0114* (2013.01)

(58) Field of Classification Search
CPC ................................ A01K 5/01; A01K 5/0114
See application file for complete search history.

(56) References Cited

U.S. PATENT DOCUMENTS

| | | | | |
|---|---|---|---|---|
| 4,976,223 | A * | 12/1990 | Pierce | A01K 5/0114 248/128 |
| 5,054,431 | A * | 10/1991 | Coviello | A01K 5/0114 119/51.01 |
| 5,584,263 | A * | 12/1996 | Sexton | A01K 5/0114 119/51.5 |
| 7,665,417 | B1 * | 2/2010 | Harper | A01K 5/0135 119/61.5 |
| 7,938,083 | B1 * | 5/2011 | Huether | A01K 5/0114 119/61.5 |
| 8,776,725 | B1 | 7/2014 | Grijalva | |
| 9,004,455 | B2 | 4/2015 | Falcon | |
| 9,144,225 | B1 * | 9/2015 | Gaccione | A01K 5/0114 |
| 10,149,456 | B2 * | 12/2018 | Diamond | A01K 5/0114 |
| 10,524,451 | B1 * | 1/2020 | Sciortino | A01K 5/0114 |
| 10,618,702 | B1 | 4/2020 | Alexander | |
| 11,013,213 | B1 * | 5/2021 | Gelinas | A01K 5/0114 |
| 2006/0107847 | A1 | 5/2006 | Kissel | |
| 2006/0159815 | A1 | 7/2006 | Crook et al. | |
| 2006/0288946 | A1 * | 12/2006 | Brillon | A01K 5/0114 119/61.56 |
| 2008/0035066 | A1 * | 2/2008 | Enriquez | A01K 5/0114 119/61.5 |
| 2009/0145365 | A1 | 6/2009 | Mahle et al. | |
| 2009/0180843 | A1 | 7/2009 | Jackson et al. | |
| 2010/0148645 | A1 * | 6/2010 | Harper | A01K 5/0114 119/61.57 |
| 2012/0325158 | A1 * | 12/2012 | Holman | A01K 5/0135 312/249.8 |
| 2015/0313176 | A1 * | 11/2015 | Gelinas | A01K 29/00 119/51.5 |
| 2016/0316715 | A1 * | 11/2016 | Diamond | A01K 5/0114 |
| 2016/0341354 | A1 * | 11/2016 | Steiner | F16M 11/24 |

(Continued)

*Primary Examiner* — Jessica B Wong

(74) *Attorney, Agent, or Firm* — Cramer Patent & Design, PLLC.; Aaron R. Cramer

(57) ABSTRACT

An adaptive pet feeding station designed to facilitate the feeding of pets without the need for physical exertion by the pet owner. This station includes a vertically adjustable bowl platform, capable of supporting food and water bowls at varying heights to accommodate pets of different sizes. Integrated storage units provide space for pet supplies, while a control switch allows for easy adjustment of the platform height. The station operates on either electricity or batteries and can be integrated with smart home systems for automated control. Designed for convenience, safety, and ease of use, this invention aims to enhance the pet feeding experience.

1 Claim, 5 Drawing Sheets

(56) References Cited

U.S. PATENT DOCUMENTS

| | | | | |
|---|---|---|---|---|
| 2019/0090452 | A1 | 3/2019 | Grijalva | |
| 2019/0380304 | A1* | 12/2019 | Batts | F16M 11/18 |
| 2022/0394952 | A1 | 12/2022 | Strauss | |
| 2023/0203740 | A1 | 6/2023 | Burgess et al. | |
| 2024/0407328 | A1* | 12/2024 | Vogel | A01K 5/02 |
| 2024/0425333 | A1* | 12/2024 | Blickle | B66F 9/02 |

* cited by examiner

FEEDING STATION ELEVATOR

RELATED APPLICATIONS

None.

FIELD OF THE DEVICE

The present invention pertains to the field of pet care devices, specifically to an adaptive pet feeding station designed to improve the feeding process for domestic pets.

BACKGROUND OF THE DEVICE

The conventional practice of feeding pets typically involves the manual placement of food and water bowls on the ground, requiring pet owners, especially those with physical limitations, to bend or stoop. This routine task can pose a challenge for individuals with mobility issues, the elderly, or those with disabilities, potentially deterring them from pet ownership or complicating the care of their pets. Furthermore, the static placement of bowls on the floor does not account for the varying heights and ergonomic needs of different pet breeds, which can lead to discomfort or health issues in pets. Existing solutions have largely ignored the integration of pet feeding into smart home systems, limiting the convenience and flexibility of pet care routines. Thus, there is a clear need for an innovative approach to pet feeding that addresses these challenges, promoting ease of use, ergonomic feeding positions for pets, and integration with modern home automation technologies.

SUMMARY OF THE DEVICE

Embodiments of the present disclosure may include a pet feeding station including a bowl platform configured to support at least one pet food or water bowl. Embodiments may also include at least two rail systems facilitating vertical movement of the bowl platform. Embodiments may also include a control switch operable to adjust the height of the bowl platform between a lowered position for pet access and a raised position for loading or cleaning.

In some embodiments, the pet feeding station may include integrated storage units adjacent. Embodiments may also include to the bowl platform for storing pet-related items, each storage unit topped with a countertop surface usable for meal preparation or decorative purposes. In some embodiments, the bowl platform may be configured to. Embodiments may also include accommodate one or more removable bowls for ease of cleaning.

In some embodiments, the pet feeding station may include an electrical or battery-powered. Embodiments may also include mechanism for the movement of the bowl platform, configured for integration with automated home systems or smart device applications for remote or scheduled operation. In some embodiments, the adjustable height of the bowl platform. Embodiments may also include may be designed to reduce stress and strain on the necks of pets while eating or drinking and to facilitate access for pet owners, particularly those who may be elderly or disabled, to manage pet feeding without the need for bending or lifting.

In some embodiments, the pet feeding station may include a guide rail and a threaded drive rod as part of each of the at least two rail systems. Embodiments may also include a drive motor connected to the drive rod for the precise and stable vertical adjustment of the bowl platform. In some embodiments, the pet feeding station, characterized by a design and material construction. Embodiments may also include that may be adaptable to various home environments and user preferences, including choices of solid wood, laminated wood, plastic, and countertop materials. In some embodiments, the pet feeding station, designed to provide a secure feeding environment. Embodiments may also include, for pets. In some embodiments, the bowls may be securely held in place on the bowl platform and the platform may be prevented from tilting or shaking by the rail systems during use.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
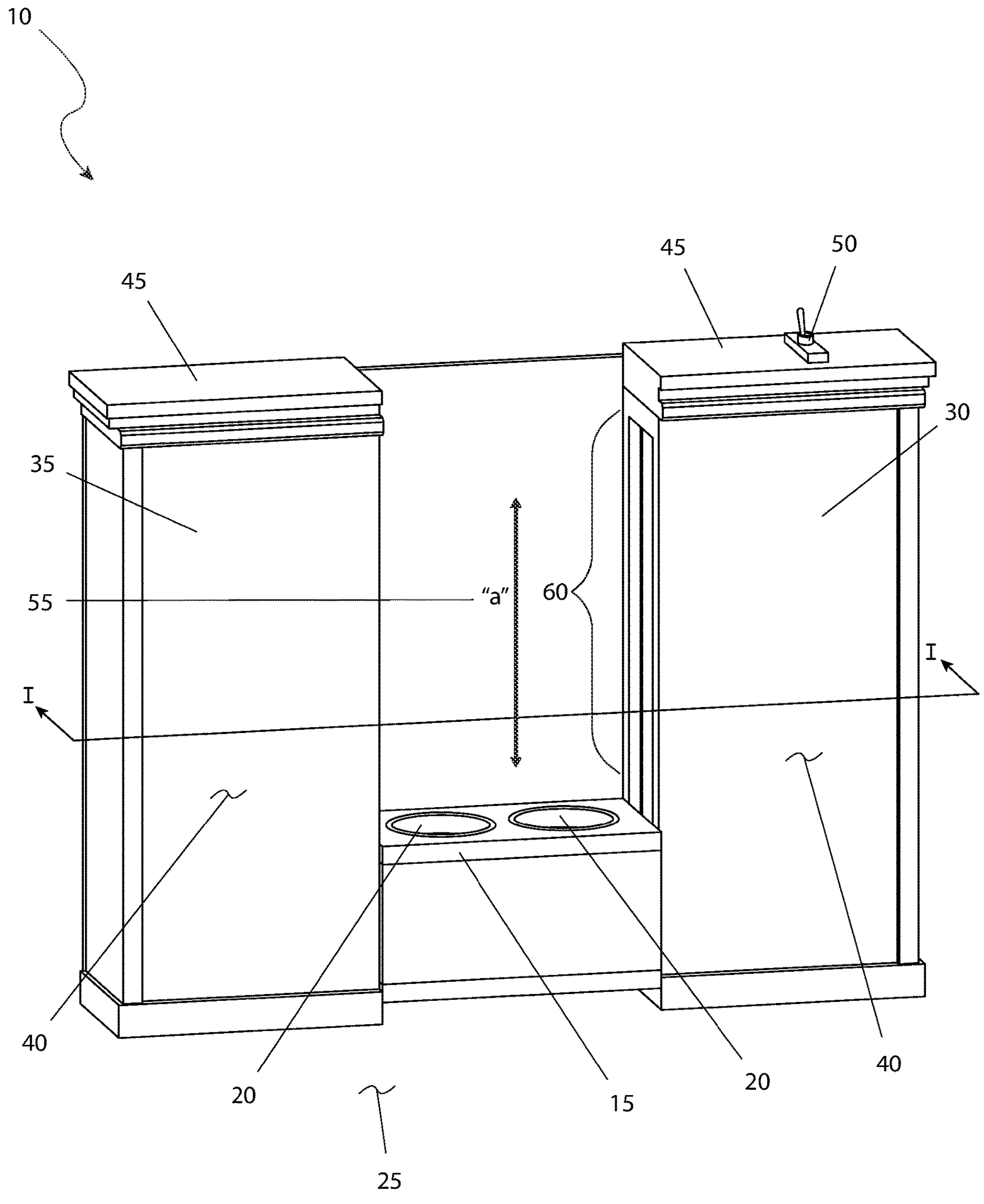
FIG. 1 is a perspective view of the feeding station 10, with the bowl platform 15 in a lowered position, according to the preferred embodiment of the present invention.

10 feeding station
15 bowl platform
20 bowl
25 floor
30 right cabinet
35 left cabinet
40 storage
45 countertop surface
50 control switch
55 bowl platform travel path "a"
60 rail system
65 pet
70 rear panel
75 power cord
80 guide rail
85 drive rod
90 T-nut
95 pulley wheel
100 drive motor
105 drive belt
110 neck

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the feeding station 10, with the bowl platform 15 in a lowered position, according to the preferred embodiment of the present invention is disclosed. The feeding station 10, provides a system and method by which at least one (1) pet 65, such as dogs, can be fed without the necessity of a pet caretaker lowering or lifting a bowl 20 to the floor 25. The bowl platform 15 provides for at least one (1) preferably two (2) or more, bowls 20. Each bowl 20 is envisioned to contain an item such as pet food and water. Each bowl 20 is envisioned to be removable from the bowl platform 15, such as by friction fit, for the purposes of periodic cleaning if necessary. In the lowered position, the top of the bowl platform 15 and thus the top of any bowl 20 is approximately six to eight inches (6-8 in.) from the floor 25.

The feeding station 10 provides for a right cabinet 30 and a left cabinet 35 which border the bowl platform 15 on both sides. The right cabinet 30 and the left cabinet 35 may be provided with doors or shelves (not shown) and may provide storage 40 for items such as pet food, pet treats, pet supply and care items and the like. The presence or lack of storage 40 is not intended to be a limiting factor of the present invention. The top of the right cabinet 30 and the left cabinet 35 are each provided with a countertop surface 45. The countertop surface 45 may be used for preparation of pet meals, storage, decorative items, or the like. The countertop surface 45 would be provided at typical countertop height, such as found with conventional kitchen cabinets, such that it is easily accessed and used by a typical adult. A control switch 50 is provided on top of one (1) of the countertop surfaces 45 for purposes of raising and lowering the bowl platform 15 along a bowl platform travel path "a" 55. The bowl platform 15 moves along two (2) rail systems 60 (of which only one (1) is shown in FIG. 1 due to illustrative limitations). Further detail on the operation of the rail systems 60 and associated control switch 50 will be provided herein below. The lowered position of the bowl platform 15, as shown, would be as expected when the contents of any bowl 20 would be consumed by a pet 65 (not shown in this figure).

Figure 2:
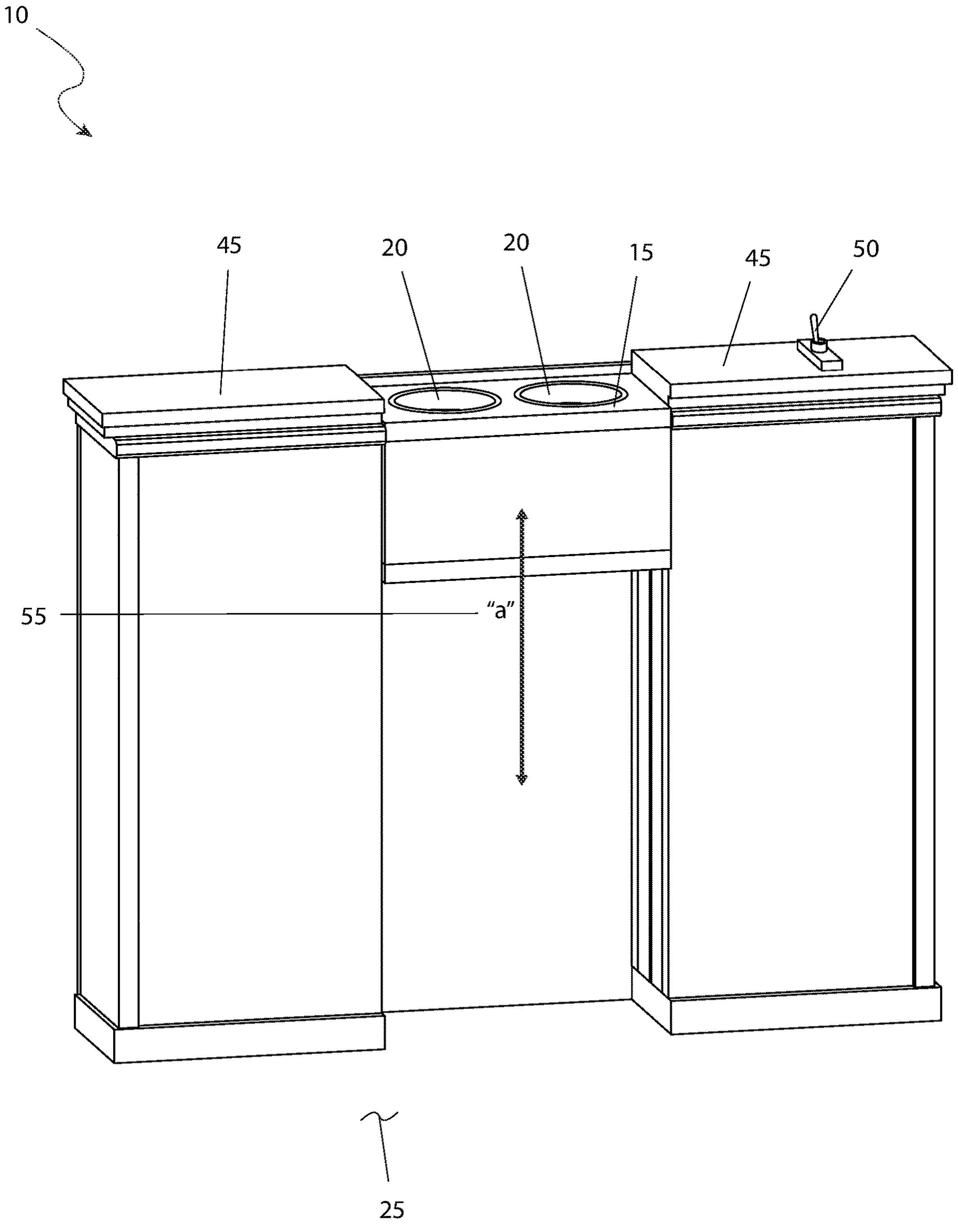
FIG. 2 is a perspective view of the feeding station 10, with the bowl platform 15 in a raised position, according to the preferred embodiment of the present invention.

Referring next to FIG. 2, a perspective view of the feeding station 10, with the bowl platform 15 in a raised position, according to the preferred embodiment of the present invention is depicted. This view depicts the bowl platform 15 at the top of the bowl platform travel path "a" 55 such that the upper surface of the bowl platform 15 is at or near the same as the upper plane of the countertop surface 45.

Positioning of the bowl platform 15 as shown is accomplished by manipulation of the control switch 50. It is envisioned that the control switch 50 is of a double pole-double throw design with a spring return to center. As such, in one (1) of the outer positions, the control switch 50 will drive the bowl platform 15 downward, in the opposite position, the control switch 50 will drive the bowl platform 15 upward, and when released, the control switch 50 will spring return to its center or OFF position. In such a manner, the user of the feeding station 10 can release the control switch 50 when the desired position is reached, allowing the bowl platform 15 to stop at any position along the bowl platform travel path "a" 55. Such a feature is envisioned as invaluable with pet 65 (not shown in this figure) of different breeds or sizes, such that with larger pet 65 the bowl platform 15 can be positioned higher above the floor 25, and with smaller pet 65 the bowl platform 15 can be positioned lower to the floor 25. The raised position of the bowl platform 15, as shown, would be as expected when the pet caretaker would be preparing or filling any bowl 20. This position is envisioned as invaluable by those individuals, such as the elderly or disabled, who experience difficulty in placing conventional pet food or water bowls on the floor 25 as well as lifting them up.

Figure 3:
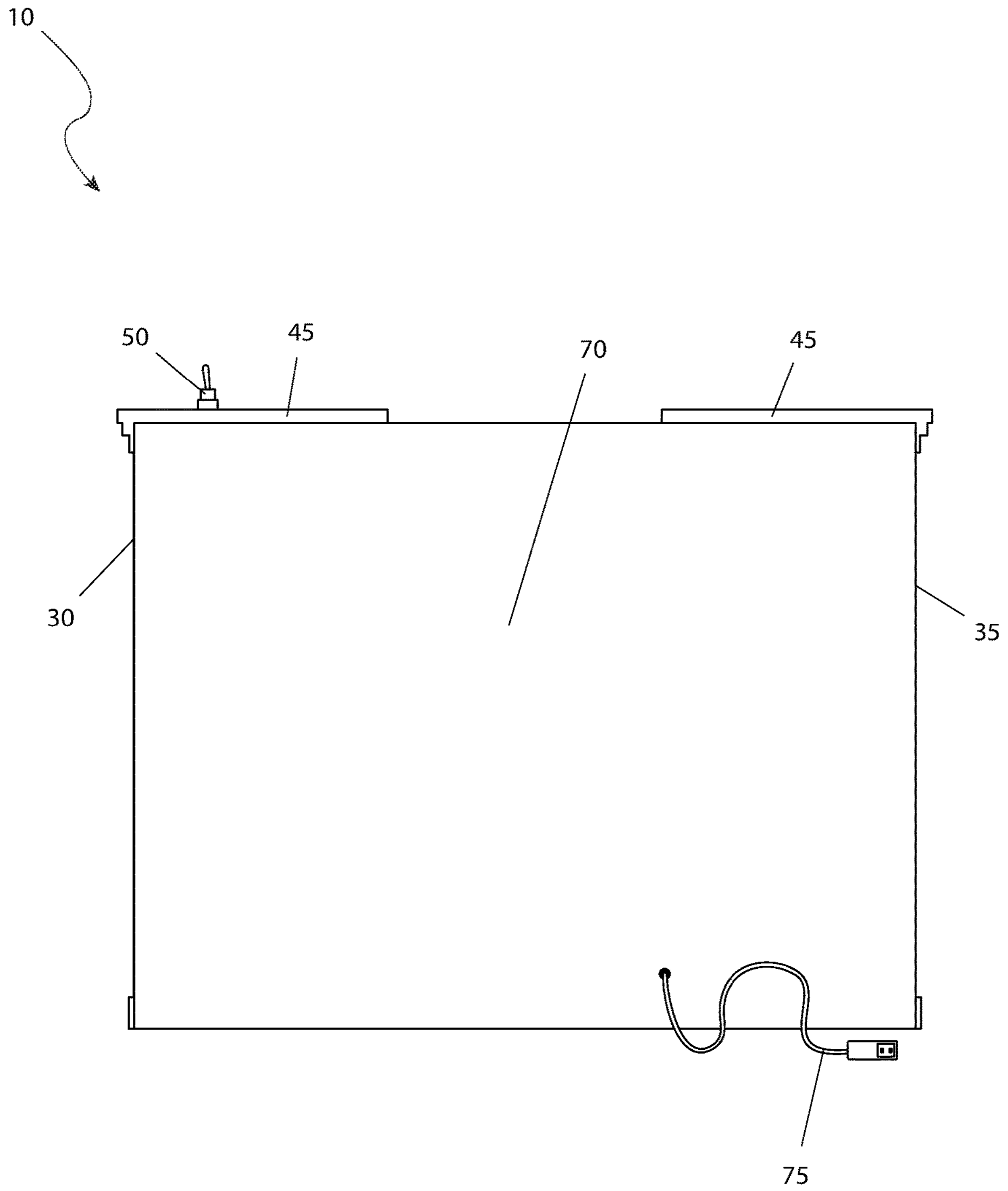
FIG. 3 is a rear view of the feeding station 10, according to the preferred embodiment of the present invention.

Referring now to FIG. 3, a rear view of the feeding station 10, according to the preferred embodiment of the present invention is shown. A rear panel 70 covers both the right cabinet 30 and the left cabinet 35 as well as the center section containing the bowl platform 15 (not visible in this figure, due to illustrative limitations). The control switch 50 is visible on top of the countertop surface 45. A power cord 75 is shown exiting the rear panel 70 where it would be connected to an AC power receptacle. Alternate versions which would be powered by rechargeable batteries are also envisioned. The exact method of powering the feeding station 10 should not be interpreted as a limiting factor of the present invention. It is also envisioned that operation of the feeding station 10 could be accomplished by an automated home system, allowing control of the feeding station 10 via a dedicated schedule, or via a smart phone application.

Figure 4:
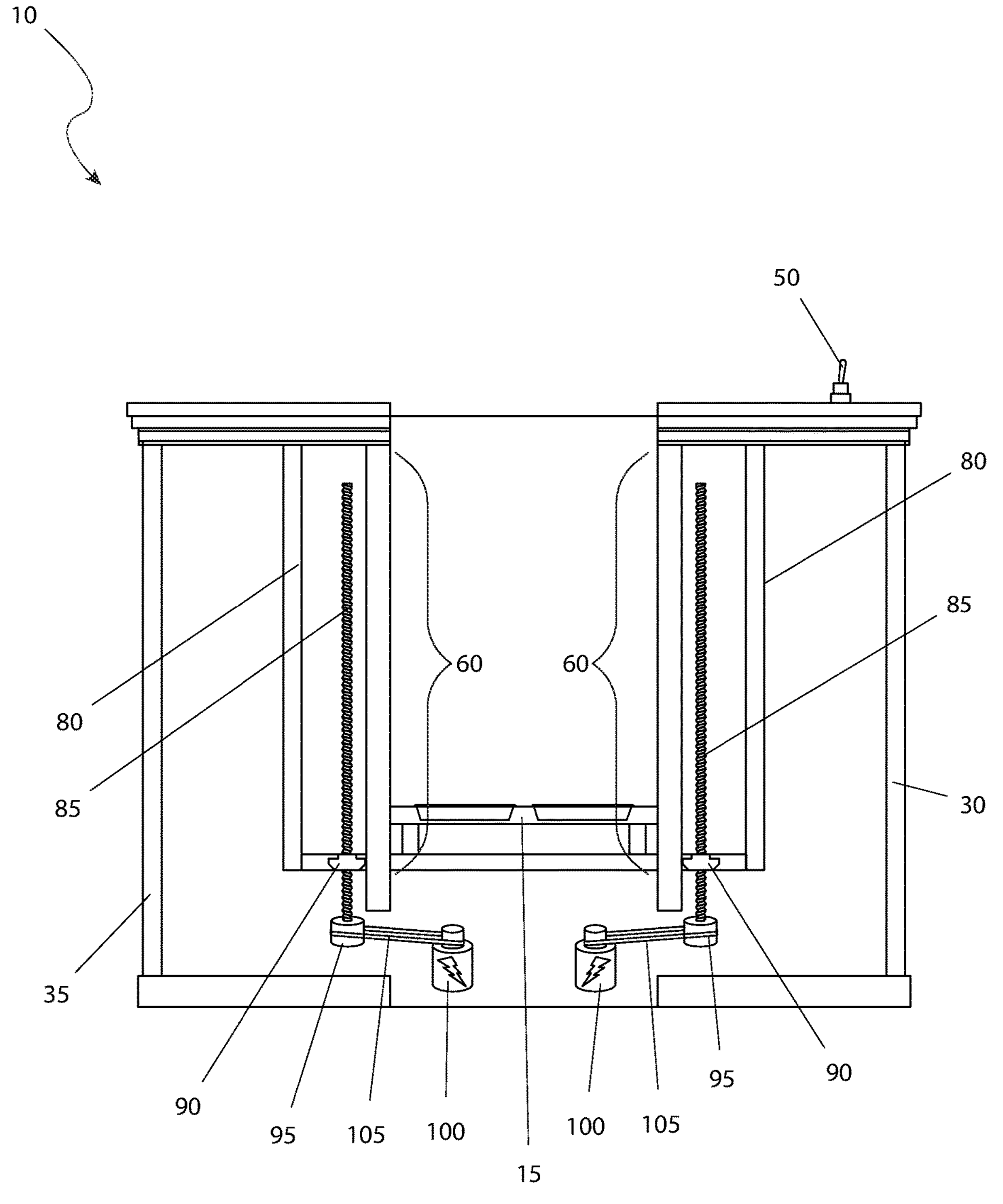
FIG. 4 is a sectional view of the feeding station 10, as seen along a line I-I, as shown in FIG. 1, according to the preferred embodiment of the present invention; and, FIG. 5 is a perspective view of the feeding station 10, shown in a utilized state with a pet 65, according to the preferred embodiment of the present invention.

Referring next to FIG. 4, a sectional view of the feeding station 10, as seen along a line I-I, as shown in FIG. 1, according to the preferred embodiment of the present invention is disclosed. Each of the two (2) rail systems 60 is comprised of a guide rail 80 and a threaded drive rod 85 operating within the confines of both the right cabinet 30 and the left cabinet 35. The guide rail 80 serves to keep the bowl platform 15 from tilting side to side. The drive rod 85 then drives the bowl platform 15 up and down along the bowl platform travel path "a" 55 (as shown in FIG. 1). The drive rod 85 is secured within a T-nut 90 at its lowermost portion. The balance of the drive rod 85 is then secured in a pulley wheel 95, envisioned to be approximately ten millimeters (10 mm.) in diameter. In turn the pulley wheel 95 is then connected to a drive motor 100 via a drive belt 105. The two (2) drive motors 100 would be wired in parallel to operate simultaneously with the control switch 50, to allow for equal and stable movement of the bowl platform 15 through the rail systems 60.

Figure 5:
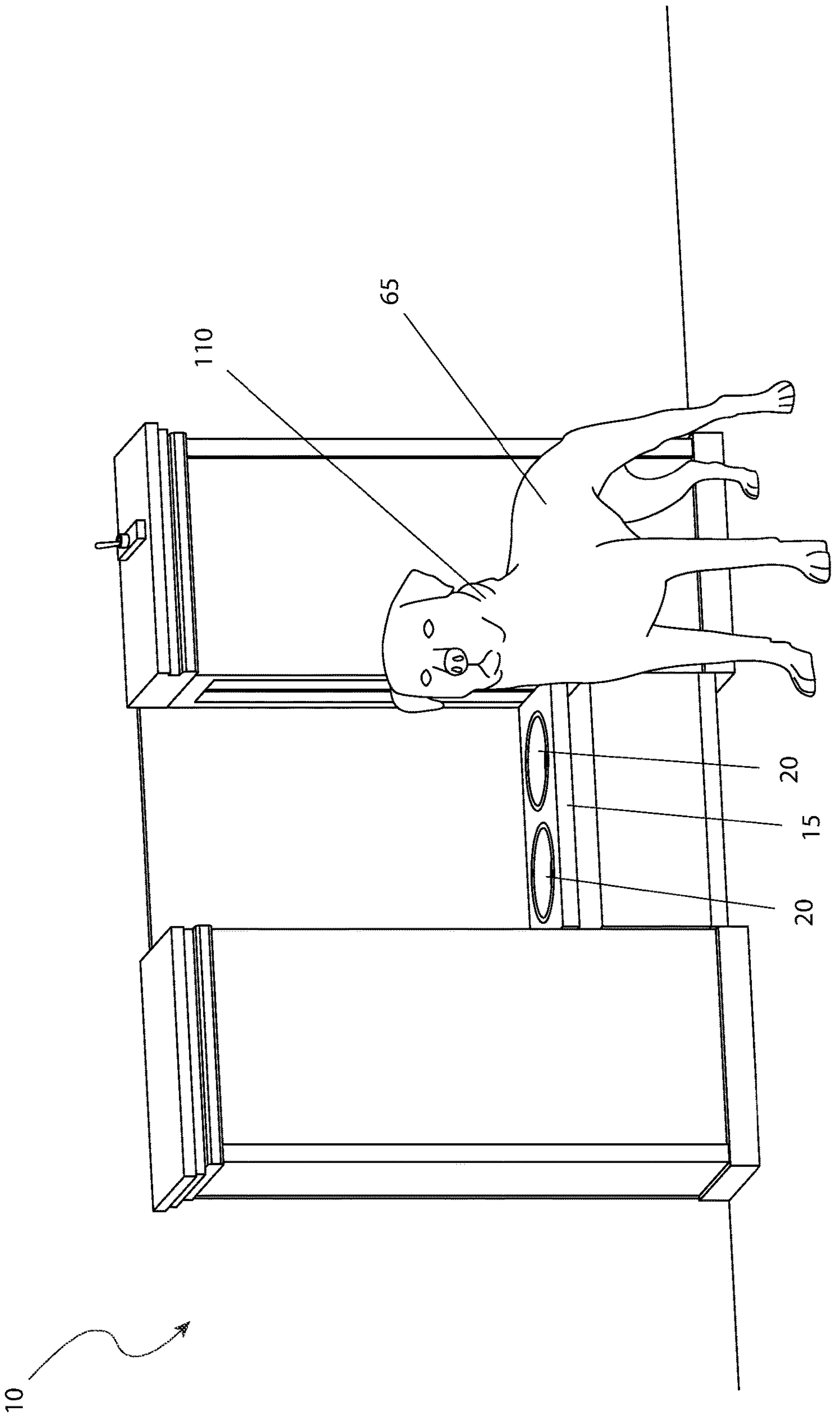

Referring to FIG. 5, a perspective view of the feeding station 10, shown in a utilized state with a pet 65, according to the preferred embodiment of the present invention is depicted. This view depicts the pet 65, herein shown as a dog for illustrative purposes, about to eat or drink from the bowls 20. The bowls 20 are secured within the bowl platform 15 are at a comfortable position such that the pet 65 may consume the contents of the bowls 20 without undue bending or craning of their neck 110.

2. Operation of the Preferred Embodiment

The preferred embodiment of the present invention can be utilized by the common user in a simple and effortless manner with little or no training. It is envisioned that the pet feeding station 10 would be constructed in general accordance with FIG. 1 through FIG. 5. The user would procure the feeding station 10 from conventional procurement channels such as furniture stores, pet supply stores, home improvement stores, department stores, discount stores, medical supply stores, mail order and internet supply houses and the like. Special attention would be paid to the overall design style of the feeding station 10 as well as the price point of the feeding station 10, which would relate to the materials of construction such as solid wood, laminated wood, plastic, and/or countertop surface 45 made of laminate materials or natural stone.

After procurement and prior to utilization, the feeding station 10 would be positioned in the desired eating area for the pet 65. The power cord 75 will be connected to a proper source of power, and any necessary pet food and/or supplies would be placed in the right cabinet 30 and the left cabinet 35 as required. At this point in time, the feeding station 10 is ready for use.

During utilization of the feeding station 10, the pet caretaker would manipulate the control switch 50 to raise the bowl platform 15 to its uppermost position as shown in FIG. 2. A caretaker would prepare and fill any or all bowls 20 with food and/or water as needed. The caretaker would then again manipulate the control switch 50 to its lowermost or near lowermost position as shown in FIG. 1 and FIG. 5. The lowermost position would be varied depending on the breed and/or size of the pet 65 being fed. A larger pet 65 would necessitate that the bowl platform 15 can be positioned higher above the floor 25, and with a smaller pet 65, the bowl platform 15 would be positioned lower to the floor 25. At this point in time pet 65 would consume the contents of any bowl 20 in a typical manner without any undue stress or strain on the neck 110 of the pet 65.

After use of the feeding station 10, it may be left in the lowered position as seen in FIGS. 1 and 5, such that the pet 65 may consume the contents of any bowl 20 throughout the day as needed. At the next feeding cycle, the above-mentioned process would then be repeated in a cyclical manner as required.

The features of the feeding station 10 are envisioned to provide the following benefits: the positioning of any bowl 20 at the exact height as needed by the pet 65 is envisioned to assist in the digestion of food by the pet 65; pet owners and caretakers no longer have to bend over to pick up or put down conventional pet bowls; and, the feeding station 10 provides the ability for pet owners who have a disability to own a pet 65 without relying on others for help.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A pet feeding station elevator comprising:

a cabinet assembly including left and right cabinets, each having a countertop surface;

a bowl platform configured to support at least one removable pet feeding bowl;

two rail systems each positioned within one of the cabinets and defining a travel path for vertical movement of the bowl platform;

each rail system comprising a guide rail and a threaded drive rod operatively secured at a lower end within a T-nut fixed to the bowl platform and at an upper end to a pulley wheel; and, two drive motors connected via drive belts to the pulley wheels, the drive motors wired in parallel and coupled to a control switch mounted on one of the countertop surfaces for raising and lowering the bowl platform; and, wherein actuation of the control switch in a first direction causes simultaneous rotation of the drive motors and drive belts, thereby winding the threaded drive rods to lift the bowl platform to an upper position aligning with the countertops, and actuation in a second direction reverses the movement to lower the bowl platform to a floor-accessible position;

wherein the bowl platform is stopped at any position along the travel path by releasing the spring-returned control switch; and, wherein the guide rails prevent lateral tilting of the bowl platform during vertical movement.

* * * * *